United States Patent [19]

Holtz

[11] Patent Number: 4,523,773
[45] Date of Patent: Jun. 18, 1985

[54] LUGGAGE CART

[76] Inventor: Gilbert J. Holtz, 182 Tibbetts Rd., Yonkers, N.Y. 10705

[21] Appl. No.: 453,878

[22] Filed: Dec. 27, 1982

[51] Int. Cl.³ .............................................. B62B 1/04
[52] U.S. Cl. ...................................... 280/654; 16/115;
16/DIG. 24; 16/DIG. 39; 280/47.29; 280/655;
403/108; 403/322; 403/330
[58] Field of Search .............. 280/47.17, 47.28, 47.29,
280/47.37 R, 47.37 C, 655, 30, 654, 659, 47.33;
403/322 X, 330 X, 108 X; 16/115 X, DIG. 39
X, DIG. 24, 225, DIG. 13; 292/127, 86;
135/108, 109

[56] References Cited

U.S. PATENT DOCUMENTS

| 2,932,047 | 4/1960 | Johnston | 403/108 |
| 3,137,511 | 6/1964 | Weil | 280/30 |
| 3,998,476 | 12/1976 | Kazmark | 280/47.37 R |
| 4,056,115 | 11/1977 | Thomas | 403/108 |
| 4,284,287 | 8/1981 | Esposito | 280/655 |
| 4,362,307 | 12/1982 | Nakatani | 280/30 |

FOREIGN PATENT DOCUMENTS 2147 of 1863 United Kingdom ............... 403/322

Primary Examiner—Joseph F. Peters, Jr.
Assistant Examiner—Joseph G. McCarthy

[57] ABSTRACT

A luggage cart of the type which unfolds from its storage into its luggage-carrying condition and vice versa, and in which the extending and collapsing handle is the principal space-saver, having the improvements of (1) a spring-biased detent to hold the handle in its extended position and a detent release to cause withdrawal of the detent preparatory to collapsing the handle, and (2) a novel plastic hinge to establish and support the luggage-carrying platform of the cart.

2 Claims, 6 Drawing Figures

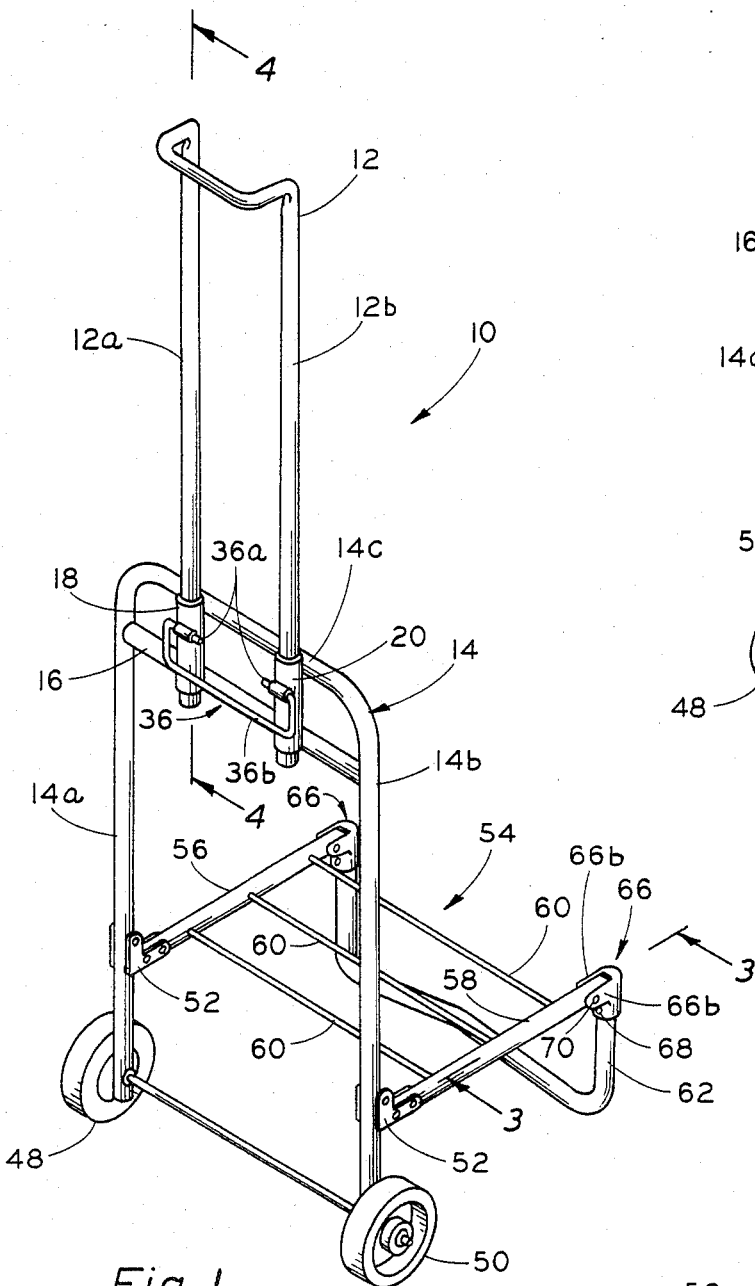
Fig. 1
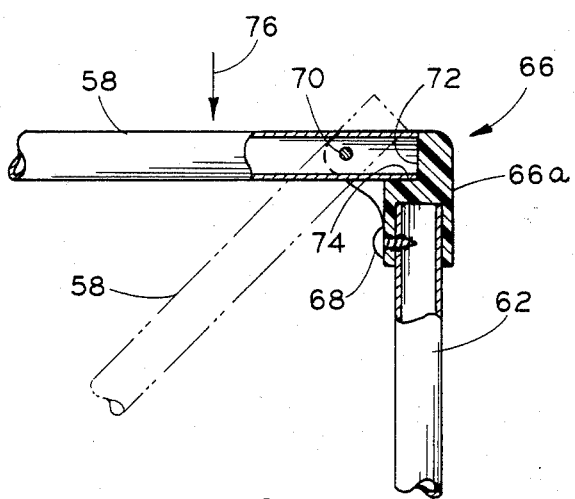
Fig. 2
Fig. 3

LUGGAGE CART

The present invention relates generally to portable luggage carts of the type seen frequently at airports or the like, and more particularly to improvements therein which facilitate the holding and subsequent release of the luggage cart handle.

As understood, to readily pull or push the luggage cart with its load of luggage, a handle appropriately extended from the back of the cart is required. This extended handle must then be "collapsed" or otherwise placed in space-saving condition, when the cart is no longer in use, in order to contribute to the convenience of storing the cart and assisting in carrying it about. To provide firmness in the extended condition of the handle a detent having a correspondingly firm spring bias would be an acceptable technique of holding the handle in its extended condition, said detent being urged by said firm spring to snap into place in an opening in the handle, as the handle moves into its operative extended position. However, the subsequent release of the handle has heretofore been a problem, since the firmness or urgency of the spring of the detent which was necessary to hold the handle in extended relation from the cart must at this time be counteracted to cause the release of the handle.

Broadly, it is an object of the present invention to provide a spring-biased detent for a luggage cart handle which despite the firmness of the spring thereof presents no problem during release of the handle, and which otherwise overcomes the foregoing and other shortcomings of the prior art. Specifically, it is an object to provide a separate member that adds little weight or complexity to the cart, but effectively causes the release of the detent preparatory to correspondingly releasing the handle for movement from its extended into its compact storage condition.

An improved luggage cart of the within invention is, as already noted, of the type which is foldable from a compact storage condition into an open condition for transporting luggage at an airport or the like. The specific construction in such a cart which demonstrates objects and advantages of the present invention is one which includes a body having a back, a transversely oriented support member connected across said back, a spaced-apart pair of cylindrical members connected in vertical relation to said support member, and a handle slidably disposed on said back for sliding movement in said cylindrical members between a compact storage position adjacent thereto and a position extending therefrom for facilitating the pushing and pulling of said cart. In accordance with the present invention, the handle is formed with two depending legs movable in said cylindrical members. Provided on each said leg is detent means which is adapted to project through openings in the cylindrical members for releasably holding the handle in its extended position on the cart back. Cooperating with said detent means is a detent-release bar means pivotally mounted on the cylindrical members so that the pivotal traverse thereof establishes contact between said bar and said detent means protruding through the openings of said cylindrical members. As a consequence, the continuation of the pivotal traverse of said bar causes the complete withdrawal of said detent means from said openings, and thus the release of the handle incident to allowing the sliding movement thereof from its extended position into its compact storage condition adjacent the cart back.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of the within improved luggage cart in its unfolded luggage-carrying condition;

FIG. 2 is a perspective view illustrating the cart in its compact storage condition;

FIG. 3 is a partial side elevational view, as seen along line 3—3 of FIG. 1, illustrating details of the plastic hinge of the cart;

The luggage cart of the present invention, generally designated 10, is of the well known type which has a unfolded luggage-carrying condition, as illustrated in FIG. 1, and also a compact storage condition, as illustrated in FIG. 2. One of the principal space-saving attributes of the cart 10 is the ability of the handle 12 to be converted from its position in which it functions as an extension of the cart back 14, illustrated in FIG. 1, in which it facilitates pushing and pulling the cart 10, into its FIG. 2 compact storage condition in which the handle 12 is adjacent the back 14.

Figure 4:
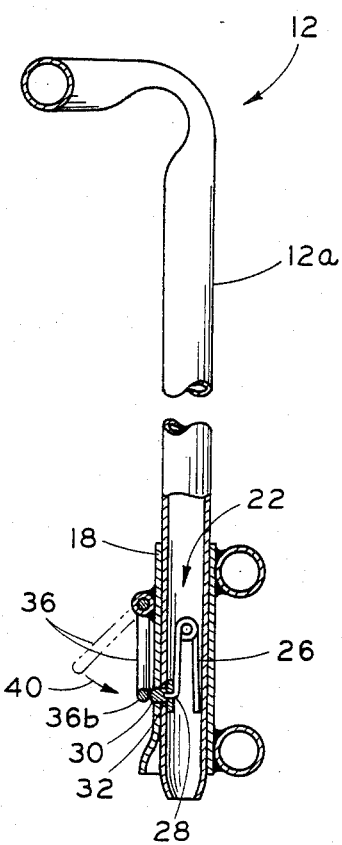
FIGS. 4, 4a and 4b, are side elevational views, in section as seen along line 4—4 of FIG. 1, illustrating the manner in which the detent which initially holds the handle of the cart in its extended position is released, to thereby correspondingly release the handle.
Figure 4A:
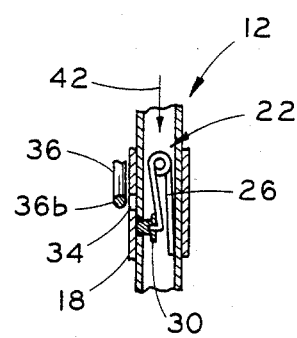
Figure 4B:
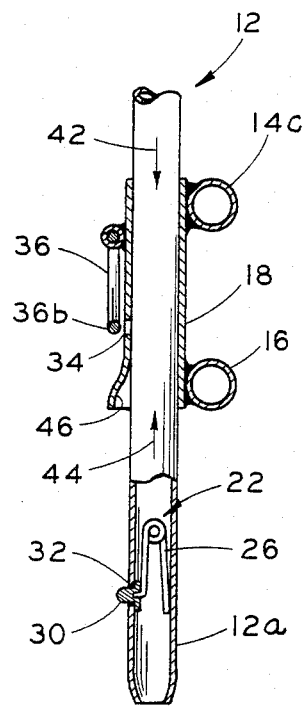

The manner in which the two positions of the handle 12 are provided as just noted, can perhaps best be understood by reference to FIGS. 4, 4a and 4b, in conjunction with FIGS. 1 and 2. More particularly, the luggage cart back 14 is an inverted U-shaped tubular member which has a support affixed to and connected in spanning relation between the sides 14a and 14b of the back, just below the back upper portion 14c. Connected in a vertical orientation, as by welding or the like, on the back upper portion 14c and on support 16 are a pair of spaced-apart cylindrical members 18 and 20. Sized to be slidably disposed in the cylinders 18 and 20 are the legs 12a and 12b of the U-shaped handle 12.

Turning now specifically to FIGS. 4, 4a and 4b, it will be understood that mounted internally of each of the handle legs 12a and 12b, and as specifically illustrated by the cross-sectional view of handle leg 12a in FIG. 4, is a spring-biased detent 22. More particularly, the detent means 22 consists of a pin 24 which mounts in place within the leg 12a a spring 26 which, on one end, as at 28, has a plastic detent 30 force fit thereon, said detent 30 being biased by the spring 26 to protrude through an opening 32 in leg 12a. Further, detent 30 is sized so that it also is large enough to protrude through an opening 34 (see FIG. 4a) that is provided in the cooperating cylinder 18, when the cylinder opening 34 is in alignment with the leg opening 30. This condition of alignment between the openings 30 and 34, in which the spring-biased detent is protruding through both these openings, is illustrated in FIG. 4. Moreover, since the leg opening 32 is adjacent the bottom end of the handle 12, the alignment between the openings 32 and 34 occurs when the handle 12 is in its FIG. 1 extended position.

To cause detent 30 to be withdrawn from the cylinder opening 34, and thus release the handle 12 for sliding movement in the cylinders 18 and 20 from its FIG. 1 extended position into its compact FIG. 2 storage condition, use is made of a pivotally movable detent-release member 36. As is perhaps best shown in FIG. 1, the detent release 36 has opposite inwardly-turned ends 36a which are rotatably mounted in cylinders 38 welded or otherwise fixed in the vertically oriented cylinders 18 and 20. Detent release 36 also includes a horizontally oriented length section or bar 36b which, as is perhaps best illustrated in FIG. 4, has a path of movement 40 by which the bar 36b establishes contact with the protruding detent 30. Thus, by continuing to push in on member 36, and thus extending the path 40, the established contact between the bar 36 and detent 30 results in the detent 30 being pushed inwardly and thus out of the cylinder opening 34. Once the detent 30 is withdrawn from the cylinder opening 34, the handle 12 can be urged through descending movement 42 so that it can be placed in its FIG. 2 compact storage condition. FIG. 4a demonstrates this sliding movement 42 in the handle 12 once the detent 30 has been forced out of the cylinder opening 34. As is also shown in FIG. 4a, the initial movement 42 in the handle 12 clears the detent from the opening 34 and, of course, therefore does not require any continued contact between the detent 30 and bar 36b.

In the remaining progressive illustration of FIG. 4b, it will be noted that the handle 12 is practically in its compact storage position adjacent the back 14 as a result of continued descending movement 42. Also to be noted in FIG. 4b is that when the detent 32 clears the bottom of cooperating cylinder 18, 20, the detent 30 is again protruded fully from the leg opening 32. Consequently, when handle 12 is moved through ascending movement 44, it is necessary to cam the detent 30 inwardly of the leg in order that the leg may continue its sliding movement up through the cylinder 18. To achieve this camming function, the bottom of each cylinder 18 and 20 is provided with a cam surface 46 in the vertical path of movement of the detent 30. Thus, when handle 12 is urged through ascending movement 44, the detent 30 first encounters the cam surface 46 and is cammed inwardly, and continued movement then carries the detent 30 up to the cylinder opening 34. When cylinder opening 34 is encountered, the spring of detent means 22 causes the detent to be projected through the opening 34 and thus holds the handle 12 in its extended position from the back 14. As already explained, this extended position remains until it is desired to place the handle 12 in its compact FIG. 2 storage condition and the detent release member 36 is then moved, in the manner already described, to push the detent 30 out of the openings 34 of the cylinders 18 and 20.

Mounted at the bottom of the cart back 14 are a pair of wheels 48 and 50, and hingedly connected, as at 52, just slightly above the wheels 48, is a luggage-carrying platform 54. Platform 54 includes two opposite sides 56 and 58 and luggage supports, individually and collectively designated 60, connected in spanning relation therebetween. A significant feature of the platform 54 is the manner in which the U-shaped leg 62 which supports the platform 54 in its horizontally oriented condition, is connected to each of the platform sides 56 and 58. More particularly, and as perhaps is best illustrated in FIG. 2, in the storage condition of the cart 10, leg 62 is folded flat against the platform 54. To then move out of the FIG. 2 storage condition, a pivotal traverse in the leg 62 is required, but this traverse must be limited to 90 degrees, or otherwise the platfrom 54 will not be horizontally oriented as required for its luggage-carrying function. To achieve this limited 90 degree traverse, and also to cover the end 64 of the platform sides 56, 58, use is made of a plastic hinge 66. Each hinge 66, as is perhaps best understood from FIG. 3 in conjunction with FIGS. 1, 2, has a tubular portion 66a which is attached, as by screw 68, to the opposite ends of the leg 62. The opposite portion of each hinge 66 is formed as bifurcated legs 66b which are pinned, as at 70, to each of the bars 56 and 58 of the luggage-supporting platform. Formed between the bifurcated legs 66b, and thus at the juncture between these legs and the tubular portion 66a, are surfaces 72 and 74 which subtend an angle of 90 degrees therebetween. Thus, when the leg 62 pivots about the pins 70, the end of each of the bars 56 and 58, as demonstrated by the bar 58 in FIG. 3, assume a seated position with respect to the surfaces 72 and 74. More particularly, the end of the bar 58 is covered by surface 72 while the underside surface abuts against surface 74 which, of course, limits the pivotal traverse in the leg 62 to an angle of 90 degrees. Also, the weight load 76 which is imposed on the luggage-carrying platform 54 is borne by the hinge connection 52 to the back 14 also by the support leg 62, and more particularly, by the surfaces 74 of each of the hinges 66 which pivotally connect the leg 62 to the platform 54.

A latitude of modification, change and substitution is intended in the foregoing disclosure, and in some instances some features of the invention will be employed without corresponding use of other features. Accordingly, it is appropriate that the appended claims be construed broadly and in a manner consistent with the spirit and scope of the invention herein.

What is claimed is:

1. An improved luggage cart of the type foldable from a compact storage condition into an open condition for transporting luggage at an airport or the like, said cart comprising a body having a back, a transversely oriented support member connected across said back, a spaced-apart pair of cylindrical members connected in vertical relation to said support member, a handle slidably disposed on said back for sliding movement in said cylindrical members between a compact storage position adjacent thereto and a position extending therefrom for facilitating the pushing and pulling of said cart, said handle being formed with two depending legs movable in said cylindrical members and having detent means thereon adapted to project through openings of a specified diameter in said cylindrical members for releasably holding said handle in said extending position on said cart back, and a cylindrical detent-release bar pivotally mounted on said cylindrical members having a diameter in cross section which is sized in relation to said diameter of each said opening of said detent means so that the pivotal traverse of said detent-release bar results in the projection thereof into said openings and establishes contact with said detent means such that the continuation of said pivotal traverse of said bar causes the complete withdrawal of said detent means from said openings and the release of said handle incident to allowing the sliding movement thereof from said extended position into said compact storage condition adjacent said cart back.

2. An improved luggage cart as claimed in claim 1 wherein each said detent means is spring-biased to project from an internal position within one of said depending handle legs through an opening in said legs and is sized to further extend through said one of said cylindrical member openings, whereby said bar is adapted to press in against said protruding detent means preparatory to causing the sliding release of said handle.

* * * * *